United States Patent [19]
Chabassier et al.

[11] Patent Number: 5,245,474
[45] Date of Patent: Sep. 14, 1993

[54] ELECTROMAGNETIC FILTER DEVICE

[75] Inventors: Geneviéve Chabassier, Paris; Jean-Michael Gabriagues, La Norville; Frédéric Heliodore, Paris; Alain Le Méhauté, Gif-Sur-Yvette; Jacques Mouchart, L'Hay Les Roses; Philippe Sautet, Trappes, all of France

[73] Assignee: Compagnie Generale D'Electricite, Paris, France

[21] Appl. No.: 795,305

[22] Filed: Nov. 20, 1991

Related U.S. Application Data

[63] Continuation of Ser. No. 327,052, Mar. 22, 1989, abandoned.

[30] Foreign Application Priority Data

Mar. 22, 1988 [FR] France ............................... 8803700

[51] Int. Cl.[5] .................................................. G02B 5/28
[52] U.S. Cl. ................................... 359/578; 359/582; 359/589; 359/885
[58] Field of Search ............... 350/164, 166, 311, 316; 359/577, 578, 580, 582, 586, 587, 588, 885, 890, 589

[56] References Cited

U.S. PATENT DOCUMENTS

| | | | |
|---|---|---|---|
| 3,423,147 | 1/1969 | Thelen | 350/166 |
| 3,914,023 | 10/1975 | Thelen | 350/164 |
| 4,647,812 | 3/1987 | Vriens et al. | 359/885 |
| 4,778,251 | 10/1988 | Hall et al. | 350/164 |

FOREIGN PATENT DOCUMENTS

| | | | |
|---|---|---|---|
| 3538996 | 5/1987 | Fed. Rep. of Germany | 350/166 |
| 0102801 | 8/1981 | Japan | 350/164 |
| 0104002 | 5/1988 | Japan | 350/311 |

OTHER PUBLICATIONS

Furman et al., "A Method for Achieving High Transmittances of Cutoff Interference Filters in a Given Spectral Range" Soviet J. Opt. Technol. (USA) vol. 36, No. 5, Sep.–Oct. 1969 pp. 647–648.
Baumeister et al., "Application of Linear Programming to Antireflection Coating Design", J. Opt. Soc. Am. vol. 67, No. 8, Aug. 1977 pp. 1039–1045.
Blanc; "New Interference Filters for the Weak ultraviolet" optica acta, 1980, vol. 27, No. 9 pp. 1313–1325.
Optics and Spectroscopy, vol. 31, n°1, 1971, pp. 71–75; F. A. Korbolev et al.:"High–contrast lightfilters with multilayer dielectric coatings".
Journal of the Optical Society of America, vol. 72, n°6, juin 1982, pp. 683–687, Optical Society of America, N.Y., US; E Pelletier et al.: "Interference filters with multiple peaks".
Applied Optics, vol. 26, n°20, Octobre 15, 1987, pp. 4487–4490, Optical Society of America, N.Y. US; H. G. Lutz: "Computer-Aided Multilayer design of Optical filters with wide tansmittance bands using SiO2 and TiO2".

Primary Examiner—Bruce Y. Arnold
Assistant Examiner—R. D. Shafer
Attorney, Agent, or Firm—Sughrue, Mion, Zinn Macpeak & Seas

[57] ABSTRACT

The optical filter device comprises a stack of thin layers exhibiting a sequences h and g which defines a fractal organization. This device makes it possible to obtain spectrum lines which are extremely fine and very well resolved.

8 Claims, 6 Drawing Sheets

ELECTROMAGNETIC FILTER DEVICE

This is a continuation of application No. 07/327,052 filed Nov. 22, 1989 now abandoned.

The present invention relates to an electromagnetic filter device.

In the field of lightwaves, prior art optical filter devices are interference filters based on the principle of stacking up thin layers, which can be made, in particular, by modern vacuum evaporation techniques. The thin layers may be made of metal material or of dielectric material and the thicknesses thereof may lie in a wide range of values, running from a few nanometers to several microns.

It is currently possible to make very narrow band filters, e.g. Fabry-Perot filters, capable of selecting spectrum lines having a width of as little as a few nanometers, together with harmonics thereof. Such filters comprise at least a score of $\lambda/4$ layers together with $\lambda/2$ Fabry-Perot cavities in series.

It is also possible to make filters capable of having identical transmission for two predetermined spectrum lines which are not harmonics of each other, but there is no known simple method of going beyond that.

It is also common practice to make highpass filters and lowpass filters. With more difficulty, it is possible to make bandpass filters and to use them as "subtraction-filters" which are more complex and which eliminate a band from within a determined spectrum range. It is not known how to make a filter having several pass bands.

At oblique angles of incidence, it is also possible to change the rectilinear, circular, or elliptical vibration of a light beam by using phase-shifting coatings, and even to physically separate two perpendicular directions of vibration by using polarizing coatings as is done, for example, in MacNeille polarizing cubes.

The object of the present invention is to provide a filter device suitable for providing an extremely narrow transmission spectrum line without any emission in its immediate vicinity, i.e. a line which is well isolated in the spectrum, or for providing a plurality of spectrum lines which are not harmonics of one another, or for providing a plurality of bands which are not harmonics of one another.

The present invention provides an electromagnetic filter device comprising a stack of electromagnetic cavities in the form of layers, the device being characterized by the fact that a first cavity of layer A of natural frequency $w_0$ and a second cavity of layer B of natural frequency $w_1$ are used, and the stack of layers $A_n$, FIG. 10, where n is greater than 1, has sequences h and g sequence f such that:

$A_1 = h(A, B)$  $B_1 = g(A, B)$
$A_2 = h(A_1, B_1)$  $B_2 = g(A_1, B_1)$
―――――――――――――――――
$A_n = h(A_{n-1}, B_{n-1})$  $B_n = g(A_{n-1}, B_{n-1})$ said stack thus exhibiting fractal organization.

By way of example, the following $A_n$ stacks may be obtained:

$A_n = A_{n-1} B_{n-1} A_{n-1}$ with $B_n = B_{n-1} B_{n-1} B_{n-1}$, $A_1 = ABA$ and $B_1 = BBB$ or $A_n = A_{n-1} B_{n-1} A_{n-1}$ with $B_n = A_{n-1} A_{n-1} A_{n-1}$, $A_1 = ABA$ and $B_1 = AAA$ or $A_n = A_{n-1} B_{n-1} A_{n-1} B_{n-1} A_{n-1}$ with $B_n = B_{n-1} B_{n-1} B_{n-1} B_{n-1} B_{n-1}$, $A_1 = ABABA$, $B_1 = BBBBB$ or $A_n = A_{n-1} B_{n-1} A_{n-1} B_{n-1} A_{n-1}$ with $B_n = A_{n-1} A_{n-1} A_{n-1} A_{n-1} A_{n-1}$, $A_1 = ABABA$, $B_1 = AAAAA$ or $A_n = A_{n-1} B_{n-1} A_{n-1} B_{n-1}$ with $B_n = B_{n-1} B_{n-1} B_{n-1} B_{n-1}$, $A_1 = ABAB$, $B_1 = BBBB$ or $A_n = A_{n-1} B_{n-1} A_{n-1} B_{n-1}$ with $B_n = A_{n-1} A_{n-1} A_{n-1} A_{n-1}$, $A_1 = ABAB$, $B_1 = AAAA$ or $A_n = A_{n-a} A_{n-1} B_{n-1} B_{n-1}$ with $B_n = B_{n-1} B_{n-1} B_{n-1} B_{n-1}$, $A_1 = AABB$ and $B_1 = BBBB$ or $A_n = A_{n-1} B_{n-1} A_{n-1} B_{n-1}$ with $B_n = A_{n-1} A_{n-1} A_{n-1} A_{n-1}$, $A_1 = ABAB$, $B_1 = AAAA$ or $A_n = A_{n-1} A_{n-1} B_{n-1} B_{n-1}$ with $B_n = B_{n-1} B_{n-1} B_{n-1} B_{n-1}$, $A_1 = AABB$ and $B_1 = BBBB$ or $A_n = A_{n-1} A_{n-1} B_{n-1} B_{n-1}$ with $B_n = A_{n-1} A_{n-1} A_{n-1} A_{n-1}$, $A_1 = AABB$ and $B_1 = AAAA$ The values of the natural frequencies $w_0$ and $w_1$ are defined by the thicknesses $e_A$ and $e_B$ and the refractive indices $n_A$ and $n_B$ of the corresponding cavities of layers A and B.

The first stack of the invention is a stack of order 2. Thus, for a device having a stack or order 2, the following succession of filters may be used, for example:

$A_2 = A_1B_1A_1 = ABABBBABA$, corresponding to seven superposed layers.

$B_2 = BBBBBBBBB$, formed of succeeding same layers.

For a device having a stack of order 3, the following succession of filters may be used:

$A_3 = A_2B_2A_2 =$ ABABBBABABBBBBBBB-BBABABBBABA (with 15 layers)

$B_3 = B_2B_2B_2 =$ BBBBBBBBBBBBBBBBBBBBBBBBBBB-BBBB (with succeeding same layers).

The filters $A_2$, $A_3$, and $A_n$ constitute examples of fractally-organized stacks.

Other characteristics and advantages of the present invention appear from the following description of embodiments given by way of non-limiting example.

FIG. 1 shows variation in the energy T transmitted by a prior art ABA type filter as a function of the normalized frequency f of the incident beam.

FIGS. 2, 3, and 4 are views analogous to FIG. 1 but applicable to different filters of the invention, being respectively of order 2, 3, and 4.

We begin with a filter layer A having a refractive index $n_A = 2.4$ and a filter layer B having a refractive index $n_B = 1.35$.

Figure 1:
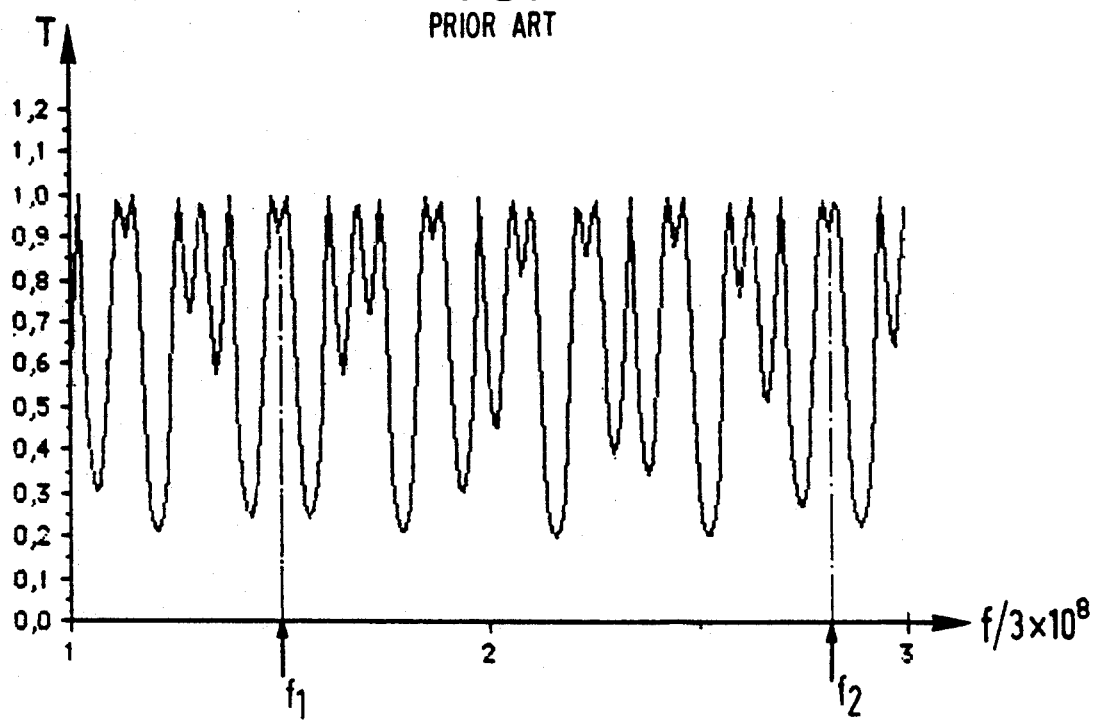

The thicknesses of A and B are selected in such a manner that $w_0 = w_1$. A prior art filter stack $A_1 = ABA$ is made whose total optical thickness is equal to 10 microns. The frequencies f are normalized by the factor $3 \times 10^8$. It can be seen in FIG. 1 that the passband on the fundamental energy, i.e. excluding harmonics, lies between $f_1$ and $f_2$, and undesired periodicity in the spectrum can be seen. Resolution is very mediocre and isolated bands cannot be seen.

Figure 2:
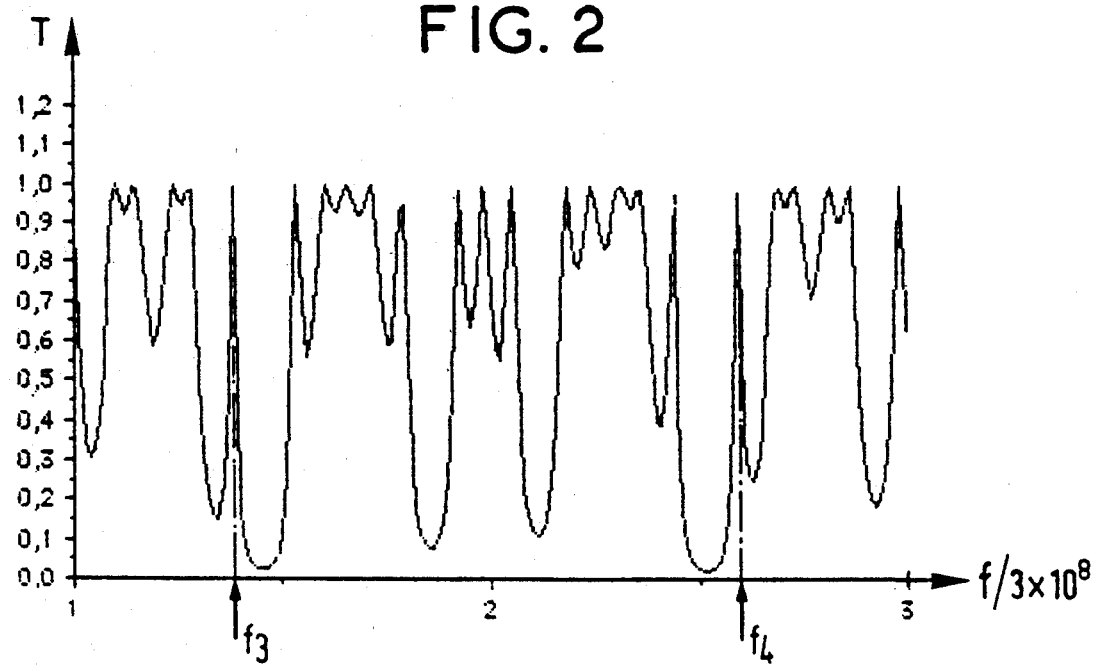

FIG. 2 corresponds to transmission through an order 2 filter, i.e. corresponding to an ABABBBABA stack of the invention having a total optical thickness equal to 10 microns. The thickness of the filter layer A is then $e_1 = 0.469$ μm and the thickness of the filter layer B is $e_B = 0.823$ μm. Fine spectrum lines $f_3$ and $f_4$ of width 1600 Å and which are very well resolved appear on the edges.

Figure 3:
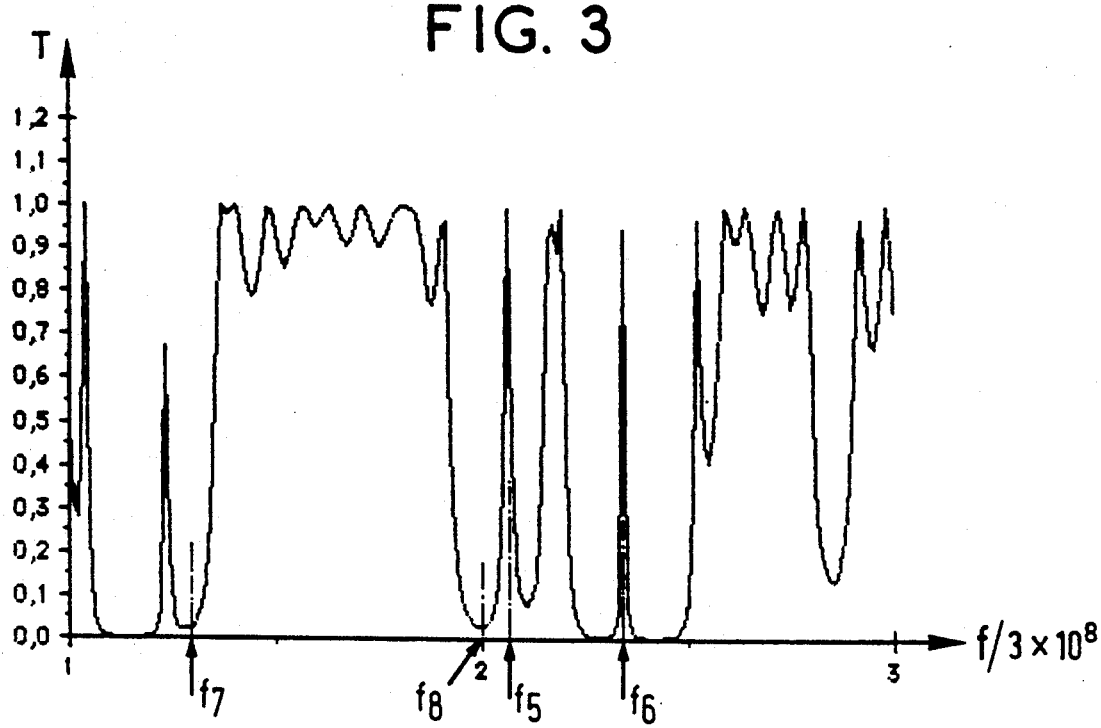

FIG. 3 corresponds to transmission through an order 3 filter, i.e. corresponding to an ABAB-BABABBBBBBBBBABABBBABA stack having a total optical thickness equal to 10 microns. The thickness of filter layer A is $e_A = 0.154$ μm and the thickness of the filter layer B is $e_B = 0.274$ μm. The spectrum lines are finer, and in particular, two spectrum lines $f_5$ and $f_6$ can be observed which are thoroughly independent of each other, with $f_6$ being particularly well resolved. The width of this line is 53 Å. A very well resolved passband between $f_7$ and $f_8$ can also be seen to appear.

Figure 4:
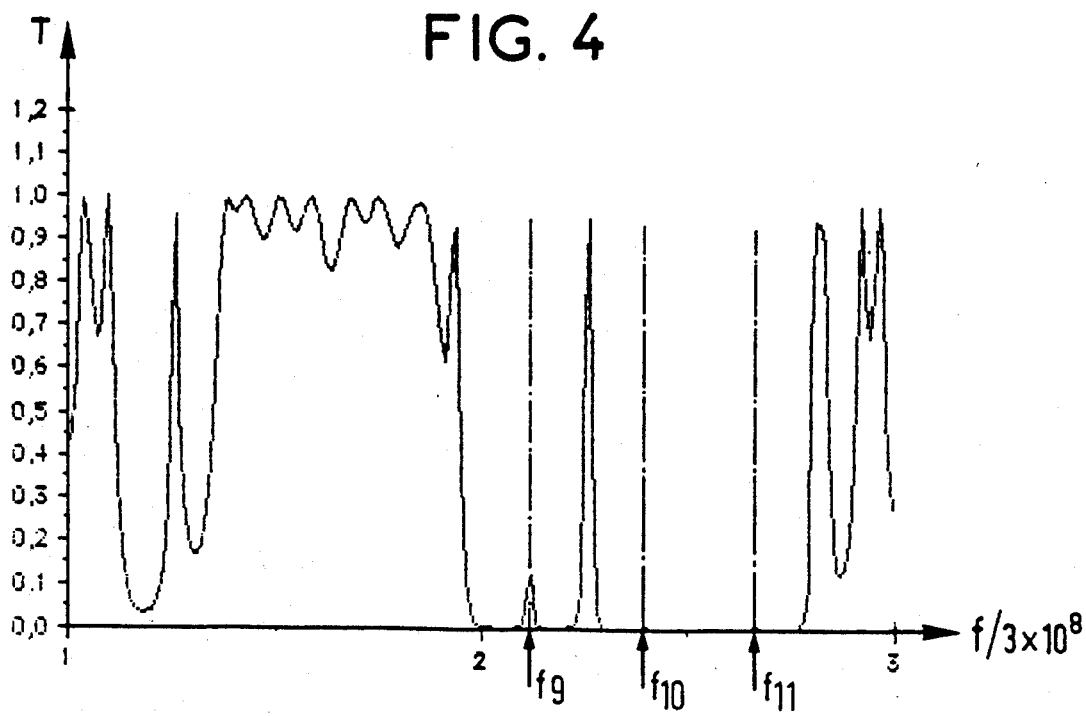

The result is even more significant in FIG. 4 which shows the transmission of an order 4 filter for which $e_A = 514$ Å and $e_B = 914$ Å. Very well isolated spectrum lines occur at frequencies $f_9$, $f_{10}$, and $f_{11}$, each having a width of much less than 10 Å.

A filter device is then shown comprising another ABABA type of prior art stack. We still begin with a filter layer A of refractive index 2.4 and a filter layer B of refractive index 1.35. The total optical thickness of the filter is 10 microns, with the thickness of filter layer A being 1.64 μ and the thickness of filter layer B being 2.537 μ.

Figure 5:
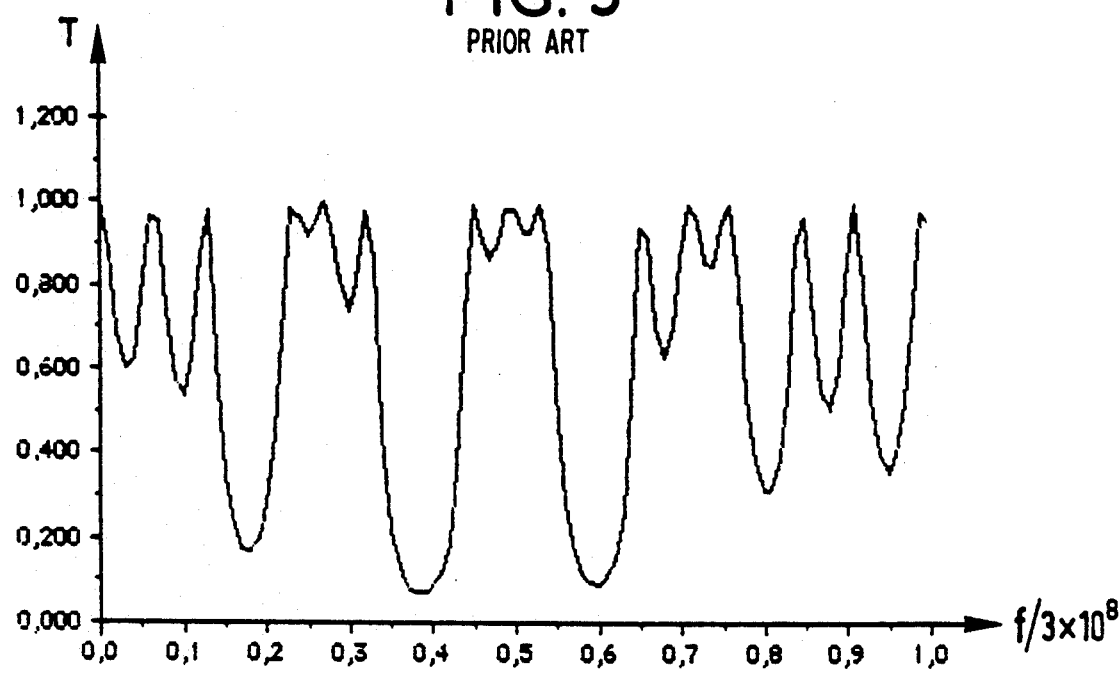
FIG. 5 is a view analogous to FIG. 1 for a prior art filter of the ABABA type.

FIG. 5 shows the transmission of this filter which had poor resolution.

Figure 6:
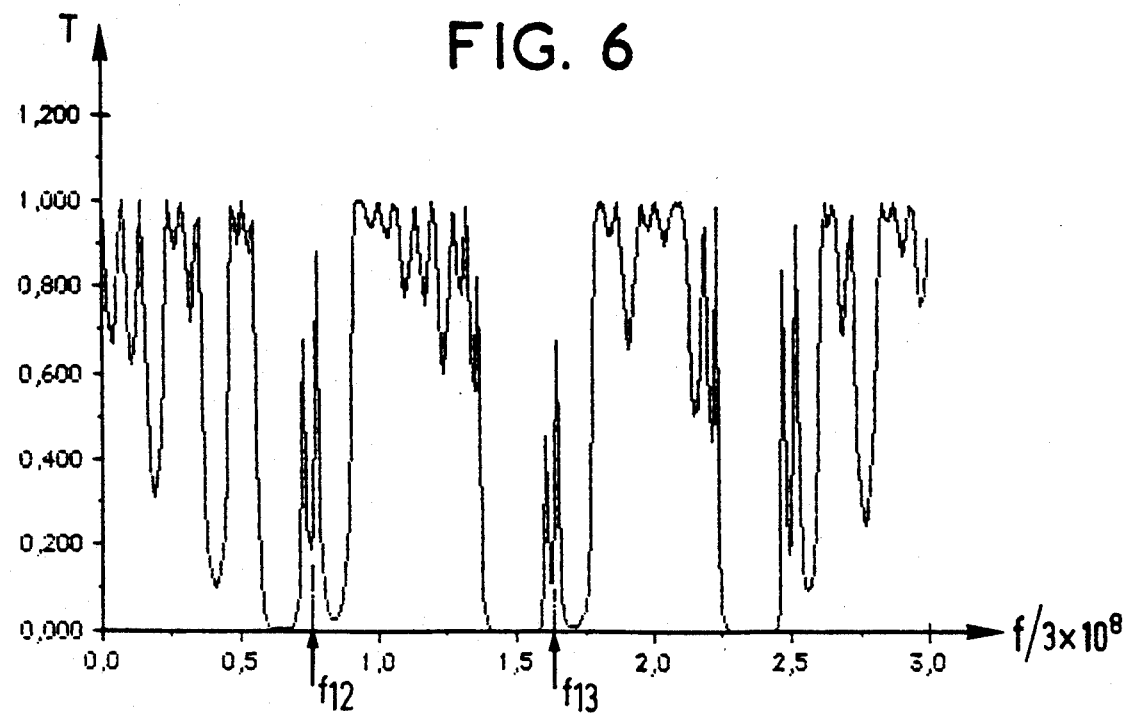
FIG. 6 is a view analogous to FIG. 2 for a filter of the invention of order 2, but having the following stack ABABABBBBBABABABBBBBABABA.

FIG. 6 corresponds to an order 2 filter of the invention, i.e. a filter having the stack; ABABABBB-BBABABABBBBBBABABA over an optical thickness of 10 microns. The thickness of the layer A is 0.269 μ and that of the layer B is 0.416 μ. Good passbands can be seen to appear together with isolated spectrum lines at frequencies $f_{12}$ and $f_{13}$ which are not harmonics of each other.

Figure 7:
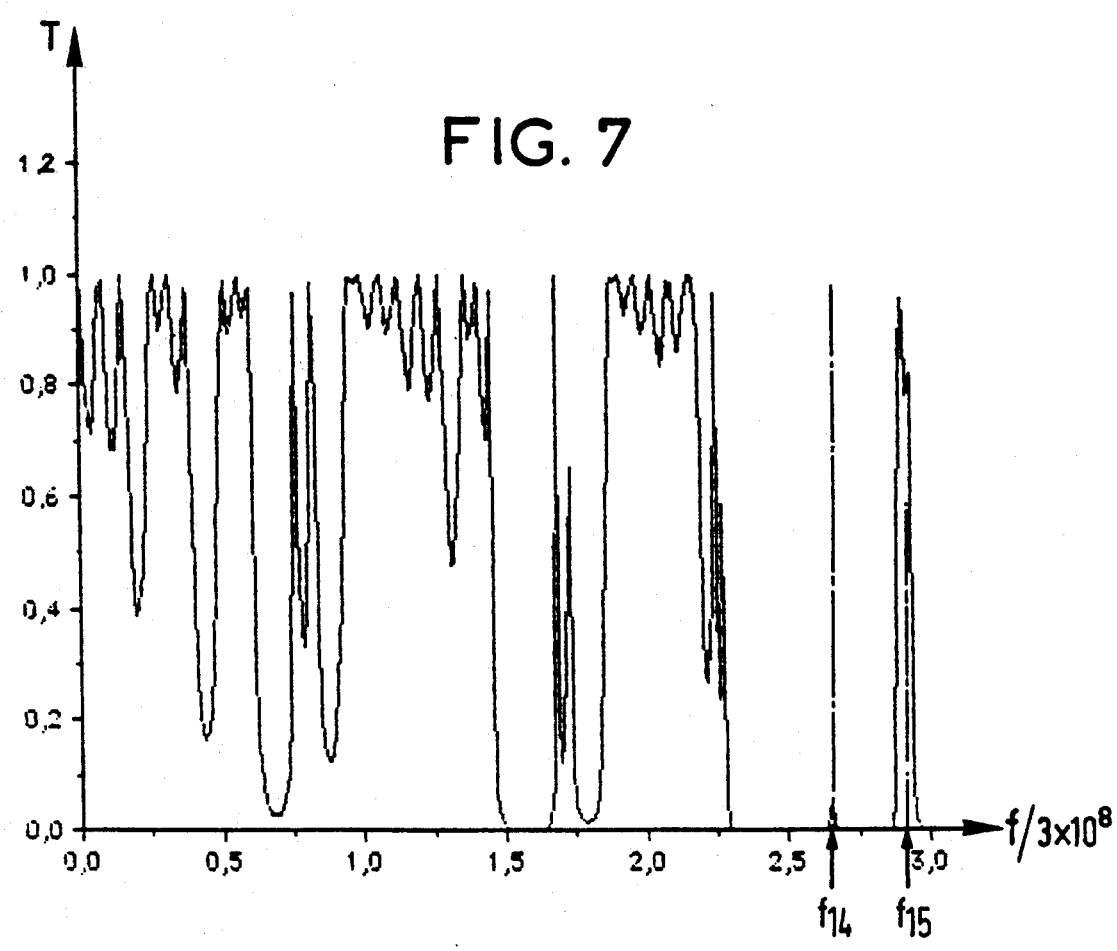
FIG. 7 is analogous to FIG. 6 for an order 3 filter of the invention.

FIG. 7 corresponds to a filter having the same sequence as that of FIG. 6 but or order 3. The thickness of layer A is then 440 Å and the thickness of layer B is 1060 Å. Very fine spectrum lines now appear at the edges of the spectrum at frequencies $f_{14}$ and $f_{15}$. These lines are very well resolved. Well separated passbands also appear.

Figure 8A:
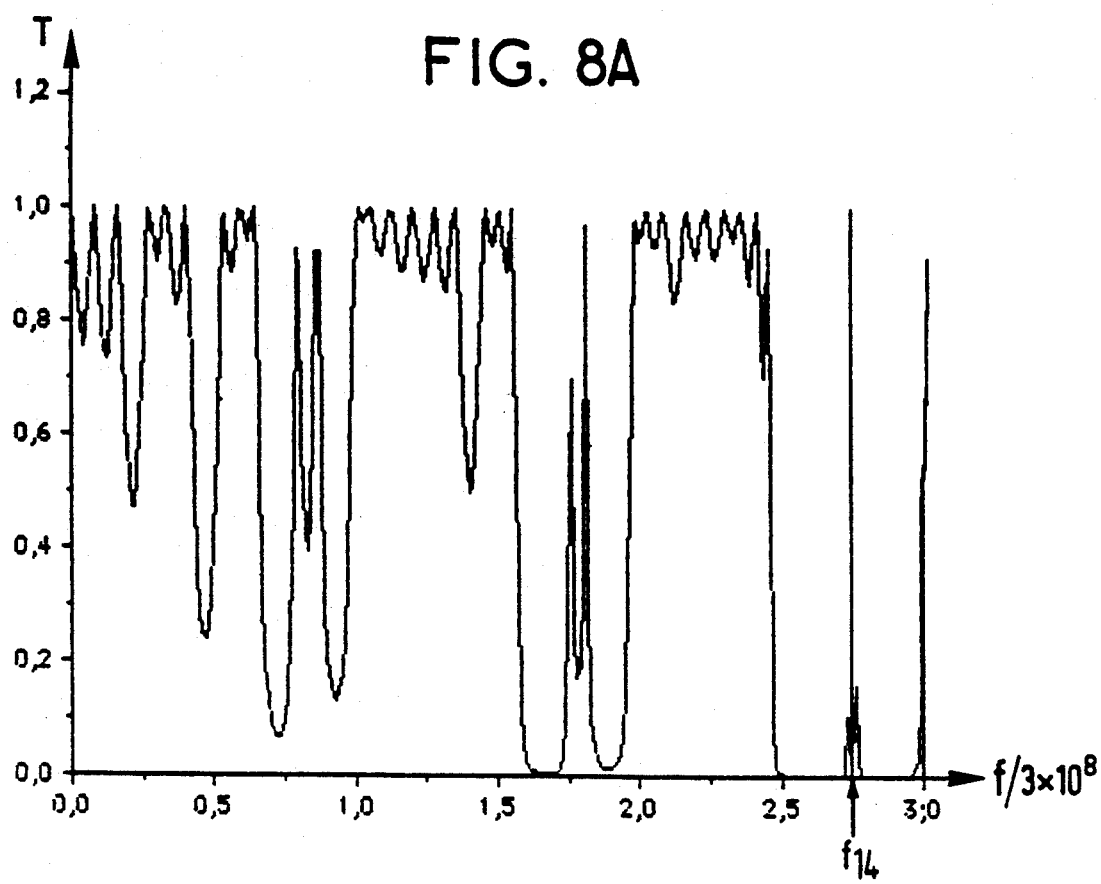
FIGS. 8A and 8B are analogous to FIG. 7 for an order 4 filter of the invention.
Figure 8B:
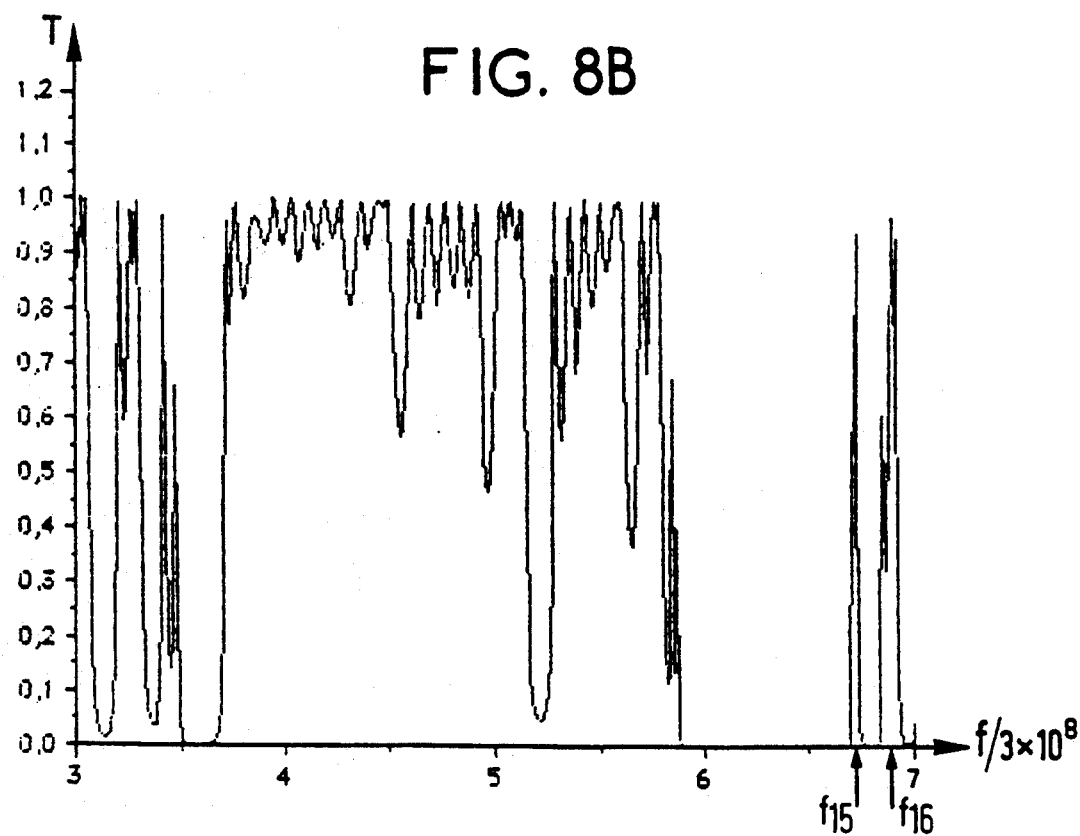

This phenomenon can also be seen in FIGS. 8A and 8B which relate to a filter having the same sequence, but of order 4. In this case, the thickness of layer A is 100 Å and the thickness of layer B is 110 Å. Spectrum lines can be observed at $f_{14}$, $f_{15}$, and $f_{16}$.

Figure 9:
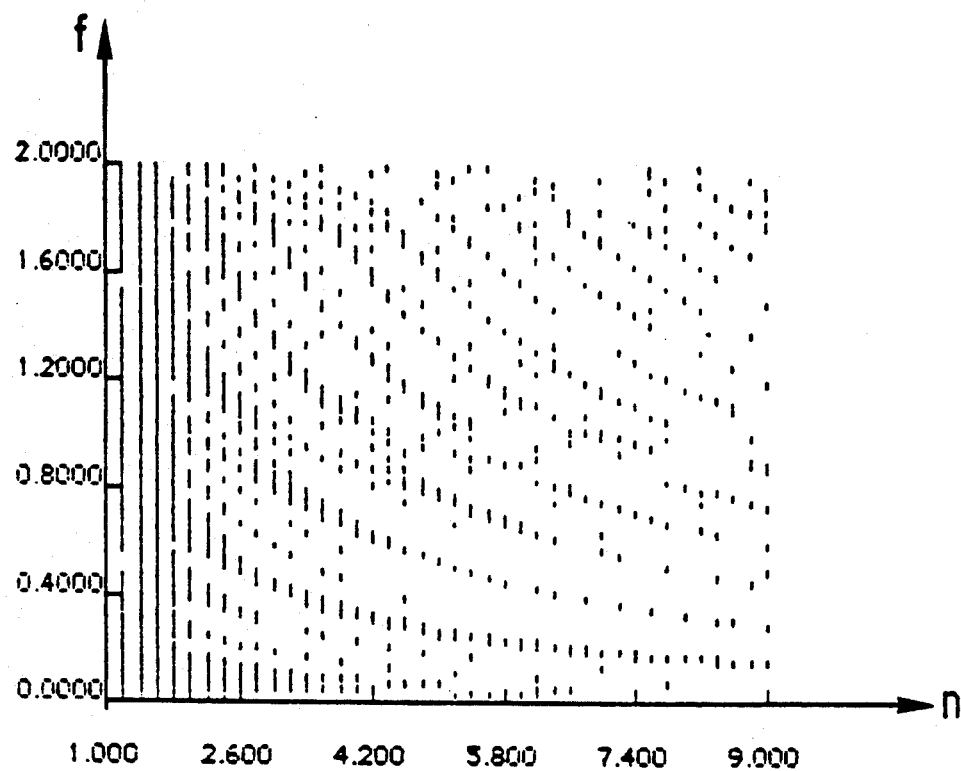
FIG. 9 is a "strange attractor" diagram showing variation in frequency transmission as a function of variation in the refractive index of B relative to the refractive index of A for an ABABBBABA filter.
Figure 10:
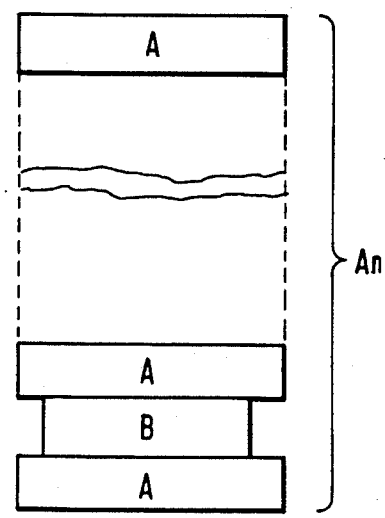
FIG. 10 is a schematic elevational view of a filter structure of generic form covering the embodiments of the invention illustrated in FIGS. 1-9.

FIG. 9 shows how the transmitted frequencies vary as a function of change in the ratio between the refractive indices of A and B. The diagram obtained is a strange attractor. This variant corresponds to a filter of order 2 as shown in FIG. 2, with a layer A of refractive index equal to 2.4 and a layer B of refractive index varying (along the X axis) from 1.2 to 9.

When the transmittance is greater than 0.7 a black point is marked, and when the transmittance is less, a white point is marked. It can be seen that frequency selection is easier in some index zones. Knowledge of the strange attractor makes it possible to establish relative values of indices suitable for locating a selected band.

Naturally, the invention is not limited to the embodiments described above, in particular the invention is not limited to filtering optical wavelengths. Further, the sequence can be applied either to the geometrical thicknesses of the layers or else to the optical thicknesses of the layers.

Finally, the thicknesses of the layers of a build-up assembly of order n can be changed by compression or rolling, etc.

We claim:

1. Electromagnetic filtering device comprising a stack $A_n$, wherein n is greater than or equal to 2, said stack consisting of layers A and B having the thicknesses $e_A$ and $e_B$ respectively, and the refractive indices $n_A$ and $n_B$ respectively, and wherein said stack $A_n$ has the following fractal configuration:

$A_n = A_{n-1} B_{n-1} A_{n-1}$ where $B_n = B_{n-1} B_{n-1} B_{n-1}$, $A_1 = ABA$ and $B_1 = BBB$.

2. Electromagnetic filtering device comprising a stack $A_n$, wherein n is greater than or equal to 2, said stack consisting of layers A and B having the thicknesses $e_A$ and $e_B$ respectively, and the refractive indices $n_A$ and $n_B$ respectively, and wherein said stack $A_n$ has the following fractal configuration:

$$A_n = A_{n-1} B_{n-1} A_{n-1}$$

where $$B_n = A_{n-1} A_{n-1} A_{n-1}, A_1 = ABA \text{ and } B_1 = AAA.$$

3. Electromagnetic filtering device comprising a stack $A_n$, wherein n is greater than or equal to 2, said stack consisting of layers A and B having the thicknesses $e_A$ and $e_B$ respectively, and the refractive indices $n_A$ and $n_B$ respectively, and wherein said stack $A_n$ has the following fractal configuration:

$$A_n = A_{n-1} B_{n-1} A_{n-1} B_{n-1} A_{n-1}$$

where $$B_n = B_{n-1} B_{n-1} B_{n-1} B_{n-1} B_{n-1}, A_1 = ABABA,$$
$$B_1 = BBBBB.$$

4. Electromagnetic filtering device comprising a stack $A_n$, wherein n is greater than or equal to 2, said stack consisting of layers A and B having the thicknesses $e_A$ and $e_B$ respectively, and the refractive indices $n_A$ and $n_B$ respectively, and wherein said stack $A_n$ has the following fractal configuration:

$$A_n + A_{n-1} B_{n-1} A_{n-1} B_{n-1} A_{n-1}$$

wherein $$B_n = A_{n-1} A_{n-1} A_{n-1} A_{n-1} A_{n-1}, A_1 = ABABA,$$
$$B_1 = AAAAA.$$

5. Electromagnetic filtering device comprising a stack $A_n$, wherein n is greater than or equal to 2, said stack consisting of layers A and B having the thicknesses $e_A$ and $e_B$ respectively, and the refractive indices $n_A$ and $n_B$ respectively, and wherein said stack $A_n$ has the following fractal configuration:

$$A_n = A_{n-1} B_{n-1} A_{n-1} B_{n-1}$$

where $$B_n = B_{n-1} B_{n-1} B_{n-1} B_{n-1}, A_1 = ABAB,$$
$$B_1 = BBBB.$$

6. Electromagnetic filtering device comprising a stack $A_n$, wherein n is greater than or equal to 2, said stack consisting of layers A and B having the thicknesses $e_A$ and $e_B$ respectively, and the refractive indices $n_A$ and $n_B$ respectively, and wherein said stack $A_n$ has the following fractal configuration:

$$A_n = A_{n-1} B_{n-1} A_{n-1} B_{n-1}$$

where $$B_n = A_{n-1} A_{n-1} A_{n-1} A_{n-1}, A_1 = ABAB,$$
$$B_1 = AAAA.$$

7. Electromagnetic filtering device comprising a stack $A_n$, wherein n is greater than or equal to 2, said stack consisting of layers A and B having the thicknesses $e_A$ and $e_B$ respectively, and the refractive indices $n_A$ and $n_B$ respectively, and wherein said stack $A_n$ has the following fractal configuration:

$$A_n = A_{n-1} A_{n-1} B_{n-1} B_{n-1}$$

where $$B_n = B_{n-1} B_{n-1} B_{n-1} B_{n-1}, A_1 = AABB,$$
$$B_1 = BBBB.$$

8. Electromagnetic filtering device comprising a stack $A_n$, wherein n is greater than or equal to 2, said stack consisting of layers A and B having the thicknesses $e_A$ and $e_B$ respectively, and the refractive indices $n_A$ and $n_B$ respectively, and wherein said stack $A_n$ has the following fractal configuration:

$$A_n = A_{n-1} A_{n-1} B_{n-1} B_{n-1}$$

where $$B_n = A_{n-1} A_{n-1} A_{n-1} A_{n-1}, A_1 = AABB,$$
$$B_1 = AAAA.$$

* * * * *